Inventor
Harry R. Gerrie

Sept. 23, 1924.  1,509,727
H. R. GERRIE
TIRE CARRIER
Filed Nov. 8, 1921   2 Sheets-Sheet 2
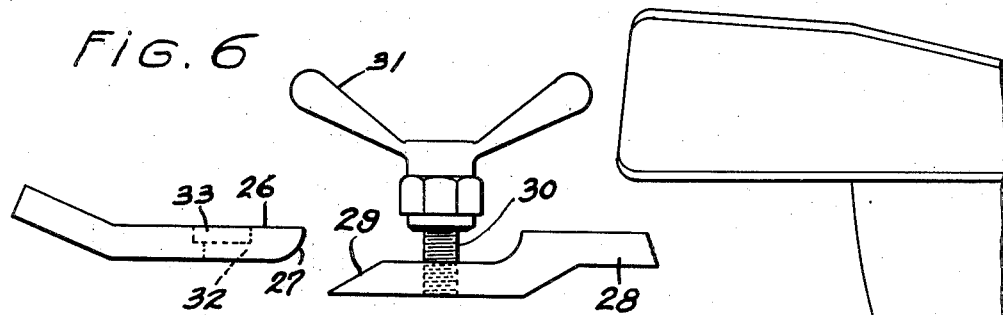
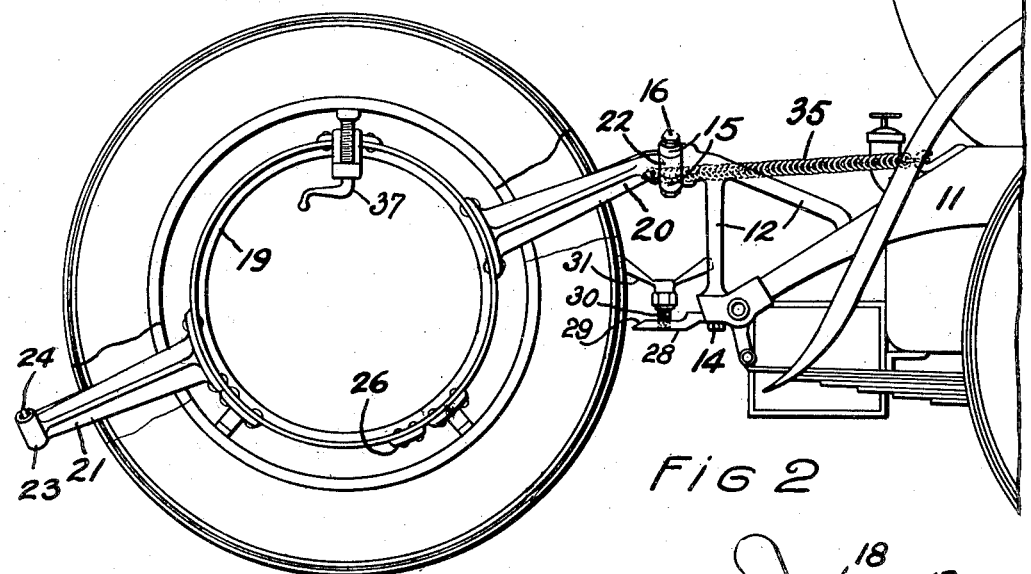
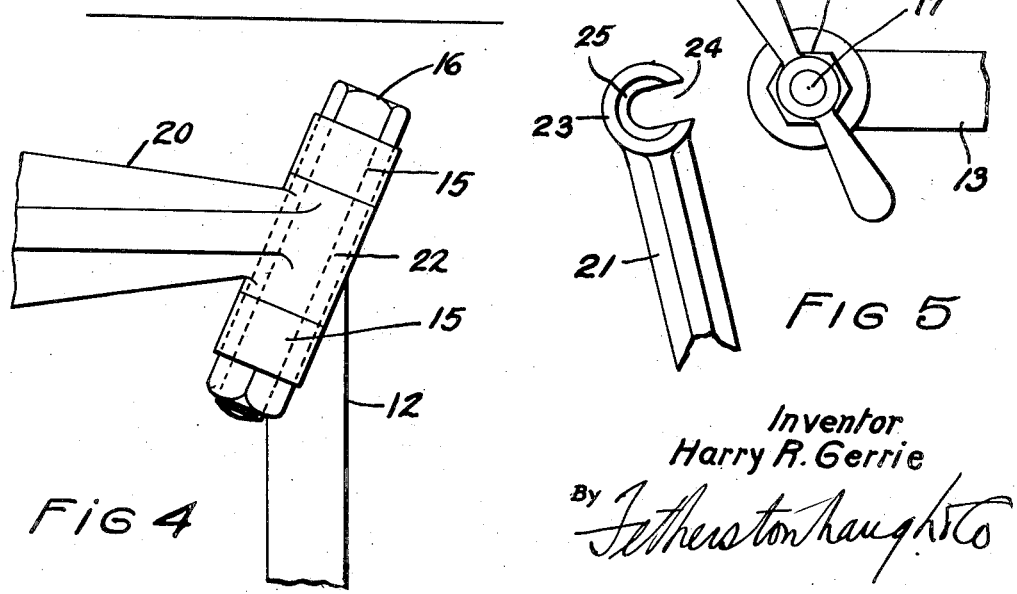
Inventor
Harry R. Gerrie
By Fetherstonhaugh & Co
Attys.

Patented Sept. 23, 1924.

1,509,727

UNITED STATES PATENT OFFICE.

HARRY R. GERRIE, OF MONTREAL, QUEBEC, CANADA.

TIRE CARRIER.

Application filed November 8, 1921. Serial No. 513,716.

*To all whom it may concern:*

Be it known that I, HARRY R. GERRIE, a subject of the King of Great Britain, and resident of the city of Montreal, in the Province of Quebec and Dominion of Canada, have invented certain new and useful Improvements in Tire Carriers, of which the following is a full, clear, and exact description.

This invention relates to improvements in tire or spare wheel carriers for automobiles and the like, and the object of the invention is to provide a carrier which will swing tires or spare wheels from the usual carrying position to a position clear of the car and either in contact with the ground or so close thereto that tires or wheels may be removed from or placed on the carrier without lifting the same.

A further object is to provide a carrier which will swing clear of the car so that tires or wheels thereon may be readily accessible.

A still further object is to provide a carrier which will permit either of two tires or wheels to be removed without disturbing the other.

The device consists briefly of a carrier extending transversely of a car and hinged at one end in such a manner that when the carrier is swung to a position of alignment with the car, it will at the same time be lowered so as to bring tires or wheels thereon substantially into contact with the ground. Means are provided to assist the movement of the carrier from a position of alignment with the car to a position transverse thereof and also to hold the carrier steady when the car is in motion and relieve its supports of stress which would be due to vibration.

In the drawings which illustrate one embodiment of the invention;—

Fig. 2 is a fragmentary side elevation of a car showing the carrier with tires thereon swung to the loading or unloading position.

Fig. 4 is an enlarged fragmentary rear elevation showing the angular disposition of the carrier pivot.

Fig. 5 is an enlarged detail plan view of the swinging end of the carrier showing the method of attaching same.

Fig. 6 is a side elevation of the supplementary carrier support.

Figure 1:
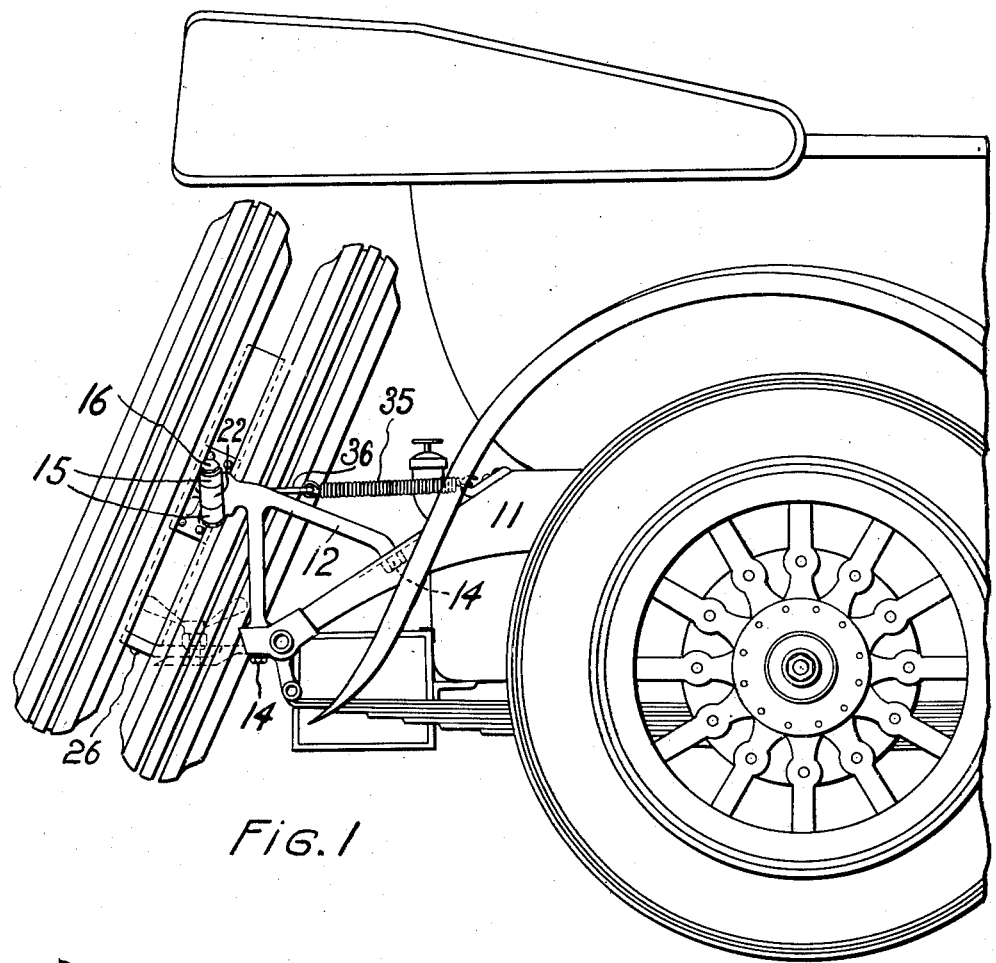
Fig. 1 is a fragmentary side elevation of a car showing the carrier in position with tires thereon.
Figure 3:
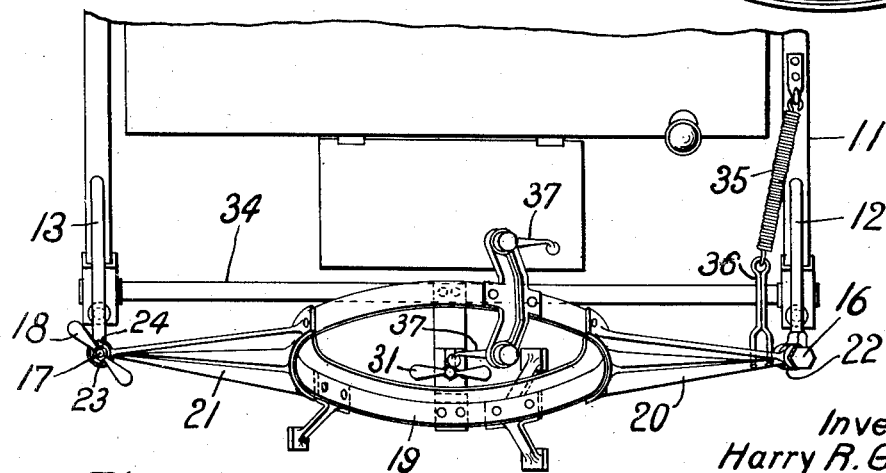
Fig. 3 is a plan view of the device.

Referring more particularly to the drawings, 11 designates the side frames of a motor vehicle or rear extension horns thereof. A pair of brackets 12 and 13 of any suitable shape, according to the shape of the frames or horns 11 are provided and rigidly attached to the frames or horns, for example, by means of nuts 14. The bracket 12 is provided with a pair of jaws 15 bored for the passage of a pivot pin 16 therethrough, the jaws being disposed at such an angle to the bracket that the pin will have a rearward or outward or rearward and outward inclination at its upper end, as clearly shown. The other bracket 13 is provided with a substantially vertical rigid post 17 threaded at its upper end and carrying a large wing nut 18.

The carrier proper will vary in design according to whether spare wheels or tires are to be carried, but it will be understood that either are included in the scope of the invention. The tire carrier illustrated comprises a central circular frame 19 provided with diametrically opposite, radially extending arms 20 and 21. The free extremity of the arm 20 is provided with an end portion 22 inclined similarly to the inclination of the bracket jaws 15 and is bored for the passage of the pin 16, which serves to hingedly connect the carrier to the bracket 12. The other arm 21 is provided with an enlarged end portion 23 adapted to rest in the carrying position on the free extremity of the bracket 13 and provided with a vertically disposed slot 24 adapted to receive the stud or post 17 of the bracket. The upper end of the portion 23 is provided with a circular recess 25 of larger diameter than the post and disposed symmetrically with respect to the slot 24, so that when the carrier arm 21 is in proper relation with the bracket 13 and the post 17 is in the slot 24, the wing nut may be screwed down to engage in the recess 25 and hold the carrier against disengagement from the bracket 13. The tires may be secured to the carrier ring 19, one on each side thereof, by any suitable means.

The carrier ring 19 is provided at a point midway between the arms 20 and 21 and preferably at what will be the lowest point in the carrying position with a tongue 26 rounded on the lower surface of its free end, as indicated at 27, Figure 6. This tongue projects forwardly of the carrier when in the carrying position and is adapted to engage a bracket 28 projecting rearwardly from the vehicle and provided with a sloping rear end 29, to enable the tongue 26 to ride up easily on the bracket. The bracket carries a stud 30 and wing nut 31, the stud being adapted to enter a slot 32 in the free end of the tongue and the nut being adapted to screw down into a circular recess 33 in the tongue. The construction of the tongue end is exactly similar to the construction of the portion 23 of the carrier. The bracket 28 may be connected to the car in any suitable way, for example, by a transverse member 34 extending between the frame members 11.

To check the outward and downward swing of the carrier and to assist the upward and inward swing thereof, a helical spring 35 may be connected at one end to the vehicle and at the other end to any suitable form of bracket 36 projecting from the carrier and attached for example to the arm 20 close to the pin 16.

The operation of the device is as follows: The carrier being in the position shown in Figures 1 and 5, the wing nuts 18 and 31 are loosened by rotating them a few turns so as to raise them out of the recesses 25 and 33. The carrier is now swung away from the rear of the car about its pivot pin 16. Owing to the inclination of this pin, the carrier swings downwardly at the same time that it swings into alignment with the car and, after swinging through approximately 90°, assumes the position shown in Figure 2, that is, with tires thereon only slightly out of contact with the ground. The small clearance between the tires and road is to prevent them being pressed down on the road by a heavy load in the car and thus rendered difficult to remove from the carrier. The tires may now be removed from the carrier without it being necessary for the operator to stoop under the folded back top of the car. It will also be seen that when the tires are disconnected from the carrier, they are in such close proximity to the ground, that no lifting is required and the tires may be merely rolled along the ground from the carrier to the wheel on which they are to be placed. It will further be seen that either tire may be removed from the carrier without disturbing the other tire. In this way, a considerable disadvantage of the ordinary tire carriers is overcome, namely, the frequent necessity of removing the outermost tire on the carrier in order to get at the innermost. Tires may be replaced on the carrier with little or any lifting and, when secured to the carrier, the same is swung through an angle of 90° into a position transverse of the car. During this swing the carrier rises to lift the tires to the carrying position. The free end 23 of the carrier slides up on the bracket 13 and embraces the stud 17. At the same time, the tongue 26 slides up on the bracket 28 until the stud 30 is embraced by the tongue. The wing nuts are then screwed down into the recesses and the carrier thus secured in the travelling position. The inclined meeting surfaces of the tongue and carrier serve to relieve the pin 16 of a part of the weight of the carrier and tires in the final movement and serve also to lift the end of the arm 21, so that it does not strike on the bracket 13 but slides smoothly to a position of rest thereon. The tongue and bracket 28 serve also to hold the carrier against vibration when the car is in motion and thereby relieve the brackets and connections between the brackets and carrier of much stress and wear. The spring 35 serves when lowering the carrier to keep the same from coming down with a rush and at the same time assists materially in raising the carrier to the travelling position. The use of an arm or bracket 36 as illustrated provides for a considerable elongation of the spring 35, while at the same time permitting the spring to be substantially in alignment with the side frame 11 when the carrier is in travelling position. Obviously the same result might be produced by attaching the spring to the arm 20 at a point remote from the pivot pin 16 but this would necessitate an unsightly and perhaps inconvenient disposition of the spring.

The advantages of the invention are numerous and will be readily appreciated by motorists. Very few among the many women who drive cars are able to change tires without great physical exertion and this is due largely to the difficulties attendant on lifting the tires on and off the ordinary form of carrier, especially as one is compelled to stand in an awkward position which prohibits proper application of the lifting force. In fact, the lifting of the larger sized tires, even under favorable circumstances, is beyond the strength of many women drivers. In addition to the foregoing, the top if folded down seriously interferes and somewhat prohibits the removal of tires from ordinary fixed carriers. The present carrier not only obviates all lifting of tires but swings the tires to a position clear of the car where they may be dealt with in comfort. As the tires are mounted on each side of the carrier, both tires are equally accessible, whereas with the ordinary fixed carriers it is necessary to remove the outer tire to give access to the inner tire on the carrier. The ability to swing the tires away from the back of the car considerably facilitates the placing of a jack under the back axle or the washing of the car. While one form of carrier has been illustrated, it will be understood that the invention is not limited to this particular form and that various other methods of attaching the tires to the carrier may be resorted to if desired. The reason that the form illustrated is preferred is that the locking screws 37 of the carrier may be positioned to lie at the highest points of the tires in the swung out position of the carrier, so that these screws may be used to lower the tire into contact with the road at the same time that it is being unlocked from the carrier. In the same way, the tire may be raised a short distance by the screw when placing it on the carrier. It will also be understood that while a carrier has been illustrated for spare tires that it may equally be formed for the carrying of spare wheels without any sacrifice of the various advantages pointed out.

Having thus described my invention, what I claim is:—

1. In a tire carrier, a pair of brackets, a carrier hingedly connected at one end with one of said brackets and slidable into supporting relation at the opposite end with the other bracket, and means intermediate the brackets to support the free end of the carrier and raise the same for supporting engagement with the bracket.

2. In a tire carrier, a pair of brackets, a carrier hingedly connected at one end to a bracket and slidable into supporting engagement at the opposite end with the second bracket, a third bracket intermediate the first two, and a tongue mounted on the carrier and adapted for engagement with said third bracket to position the free end of the carrier for proper engagement with the second bracket.

3. A device according to claim 2, in which the engaging surfaces of the carrier tongue and third bracket are inclined.

4. In a tire carrier a pair of supporting brackets, a carrier hingedly connected at one end to one of said brackets and at the other end movable into and out of supporting engagement with the second bracket, a third supporting bracket intermediate the first two, said second and third brackets being provided with posts adapted to enter slots formed respectively in the free end and in an intermediate portion of the carrier and nuts on said post engageable in recesses of said carrier to hold the posts from escape in said slots.

5. In a tire carrier, a pair of supporting brackets, a carrier having one end hingedly connected to one of said brackets, means for releasably connecting the free end of the carrier to the second bracket, a third bracket intermediate the first two including a post adapted to enter a slot formed in an intermediate part of the carrier and a nut on said post adapted to engage a recess in the carrier to hold the post against escape from said slot.

6. In a tire carrier, a pair of brackets, a carrier member hingedly connected at one end with one of said brackets and slidable in supporting engagement at the opposite end with the second bracket whereby the carrier is supported at substantially diametrically opposite points, and means to hold the carrier against oscillation about a line connecting its points of support, comprising a third supporting bracket intermediate the first two and means to releasably and rigidly connect the carrier and the third bracket.

7. In combination with a device according to claim 7, a tongue on the carrier adapted for engagement with the third bracket, the engaging surfaces of said tongue and bracket being inclined to raise the carrier into supporting engagement with the second bracket.

8. In combination with a device according to claim 7, a tongue on the carrier slotted and recessed, a stud on the third bracket engageable in the tongue slot, and a nut on said stud engageable in the tongue recess.

In witness whereof, I have hereunto set my hand.

HARRY R. GERRIE.